United States Patent [19]

Hosoi

[11] 4,317,644

[45] Mar. 2, 1982

[54] MACHINE TOOL PROFILING DEVICE

[76] Inventor: Toshiaki Hosoi, 10, 9, Kamiminami 5-chome, Hirano-ku, Osaka-shi, Osaka, Japan

[21] Appl. No.: 23,746

[22] Filed: Mar. 26, 1979

[30] Foreign Application Priority Data

Mar. 24, 1978 [JP] Japan .................. 53-34703

[51] Int. Cl.³ .................................. B23Q 35/12
[52] U.S. Cl. .................... 409/98; 409/127; 409/128
[58] Field of Search ............. 409/98, 99, 114, 127, 409/128, 129

[56] References Cited

U.S. PATENT DOCUMENTS

| 2,310,373 | 2/1943 | Rieper ........................ 409/98 |
| 2,373,332 | 4/1945 | O'Neill ....................... 409/127 |
| 2,998,759 | 9/1961 | Dugle et al. ............... 409/127 |

FOREIGN PATENT DOCUMENTS

| 49-125983 | 12/1974 | Japan ........................ 409/127 |
| 49-125984 | 12/1974 | Japan ........................ 409/127 |
| 50-54981 | 5/1975 | Japan ........................ 409/127 |
| 50-82678 | 7/1975 | Japan ........................ 409/127 |
| 50-82679 | 7/1975 | Japan ........................ 409/127 |

Primary Examiner—Z. R. Bilinsky
Attorney, Agent, or Firm—Armstrong, Nikaido, Marmelstein & Kubovcik

[57] ABSTRACT

A device comprised of a work table, tracing device and cutting device positioned above the table. The work table is capable of holding a workpiece to be cut and a model which serves as a basis for cutting the workpiece to a form identical to that of the model. The tracer includes a spindle and a stylus connected to the bottom of the spindle. The stylus moves against the outer edge of the model and, as it moves, causes the spindle to incline from side to side and displace vertically. Sensors are positioned about the spindle to monitor its movement. The sensors sends signals to the cutter so that the movement of the cutter mirrors the movement of the stylus over the model.

23 Claims, 19 Drawing Figures

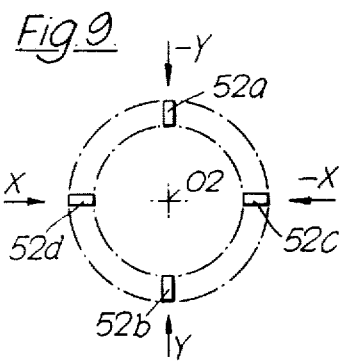
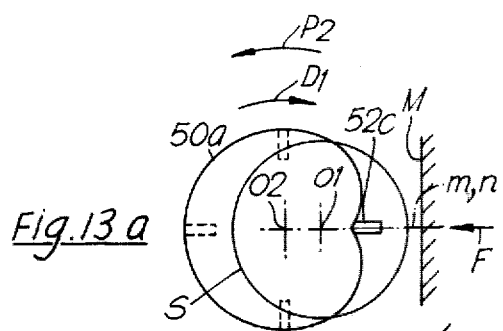
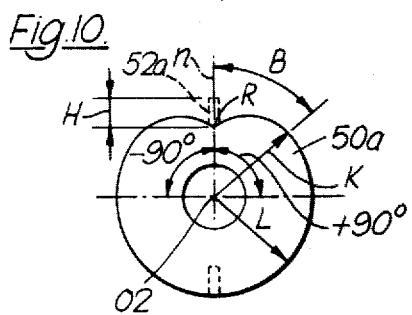
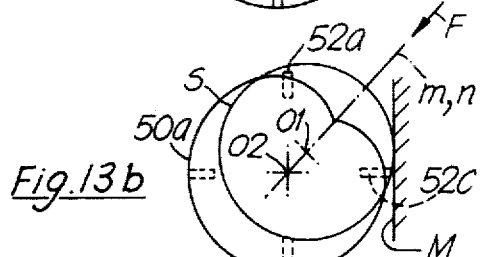
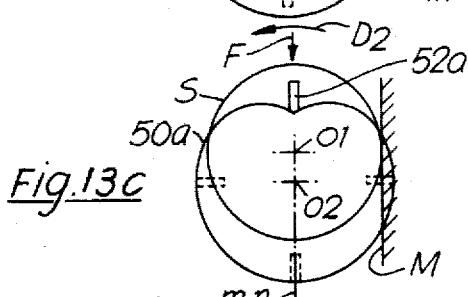
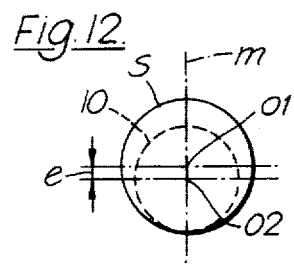
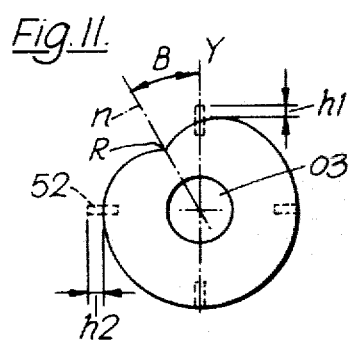
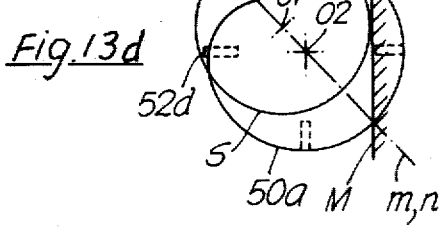

MACHINE TOOL PROFILING DEVICE

BACKGROUND OF THE INVENTION

1. Field of the Invention

This invention relates to the field of profiling devices. More particularly, this device relates to profiling devices capable of performing contour and surface profiling by means of a cutter device controlled by signals received from a sensing device which senses the movement of a tracer spindle.

2. Description of the Prior Art

In the past, profiling devices (for example, Japanese Patent Kokai No. 49-125983) were useful for contour profiling (X-Y axis profiling). Such devices are comprised of a vertical spindle which eccentrically fits a stylus, said spindle being designed to rotate in a clockwise or counter-clockwise direction when the rotating stylus contacts a model. In such devices, when the electric motor for the spindle rotates in a clockwise and then counterclockwise direction, there is created a large change of rotational speed. Such devices generally operate by rotating the spindle in the clockwise-to-zero-to counterclockwise-to-zero rotation and continually repeat this process. During this process, the heavy rotating parts (such as the rotor of the motor, the reduction gear, the spindle and the stylus) are subjected to tremendous changes in rotational speed which create substantial amounts of rotational inertia which must be absorbed by the device. The continual absorption of such energy results in wearing down and eventually destroying the machine. Also, in such devices, the rotational speed of the spindle cannot respond immediately to contract with the model. Consequently, the profiling accuracy of such a device is not satisfactory.

In a conventional surface profiling device (X-Z axis profiling), different types of problems are encountered. When the inclination of the vertical spindle is detected by a differential transformer, the cutter cannot closely mirror the movement of the stylus. In such devices, the cutter moves further into the workpiece than the stylus is moving against the model. Thus, deeper cuts than are desired are made in the workpiece and thus large amounts of compensation is allowed for. However, when such compensation is allowed for in one direction, even a greater error results in the opposite direction. When the stylus of such a prior art device profiles a horizontal plane having a steep slope thereon, the core of the differential transformer develops a large displacement from the positive position relative to the minus position. When this occurs, the cutting accuracy of the device is impaired, especially at the points on the workpiece where the cutting device is supposed to turn sharply. This is true because the differential transformer has been displaced so far to the positive position that there is a significant reaction time required in order to bring it into the minus position.

Also, since the stylus in a conventional surface profiling device is permitted to oscillate somewhat with respect to the tracer body, additional accuracy problems result. The disadvantage of this feature is apparent when profiling a workpiece in two axial directions perpendicular to each other. The stylus is kept in contact with the horizontal plane of the table on which a model and a workpiece are fixed. The table is fed to the right until the stylus hits against the right side of the ascending slope of the model. When this occurs, the stylus inclines slightly towards the right and, consequently, the cutter goes ahead of the stylus to an extent equal to the displacement caused by the inclination of the stylus. Accordingly, it is impossible to produce a workpiece in the same dimensions as the model. Some error may be compensated for by designing a stylus somewhat thicker than the cutter. However, when the thicker stylus reaches the descending slope, the inclination of the stylus is nearly cancelled. When the cutter is advanced a distance equal to the increased thickness of the stylus, the cutter has already moved beyond a point where the workpiece should be cut. Thus, the workpiece will not be cut at all or will be cut at a point beyond where it should be. For example, the table is fed to the left until the stylus touches the left ascending slope of the model. Then the left descending slope is cut accurately, but the right descending slope of the model is left uncut. Accordingly the roughness on the descending slope of the workpiece is twice as inaccurate as it normally would be in the case of a device not using such a compensative mechanism. Thus, the resulting product requires an enormous amount of finishing work.

SUMMARY OF THE INVENTION

A machine tool profiling device is presented. The device is useful for contour and surface profiling. It is comprised of a horizontal work table and a cutting device connected to said table, and positioned over the table. An arm extends from said cutting device horizontally over the table. Said arm supports a tracing device. The tracer is comprised in part of a vertically held cylindrical spindle having a stylus connected to it at its bottom. The spindle is positioned so that it may rotate freely, incline slightly from side to side, and move vertically up or down. The stylus moves over the contour end surface of a model which is held on said worktable. Various sensing detectors which are positioned about the spindle are utilized in order to interpret the precise movements which the stylus is making. The sensors then generate various signals which flow to a control system for controlling the movement of the cutter. The controlled cutter thus moves over a blank workpiece and cuts said blank into the exact form of the model.

It is an object of the present invention to provide a profiling device capable of highly accurate contour (X-Y axis) profiling.

Another object of the invention is to provide a profiling device capable of highly accurate, high speed, heavy cutting of a surface, i.e. (Z axis) profiling.

A further object of the invention is to provide a profiling device which is capable of accurately cutting a work surface from a model having a highly contoured surface.

These and other objects of the invention will become apparent to those skilled in the art upon the reading of the disclosure given below in connection with the drawings.

BRIEF DESCRIPTION OF THE DRAWINGS

FIG. 9 is a plan view of the photoelectric sensor system.

FIGS. 10 and 11 are plan views of the table shift command plate;

FIG. 12 is a schematic view of the stylus.

FIGS. 13A–13D are schematic views of the contour profiling sensor system.

DESCRIPTION OF THE PREFERRED EMBODIMENTS

Figure 1:
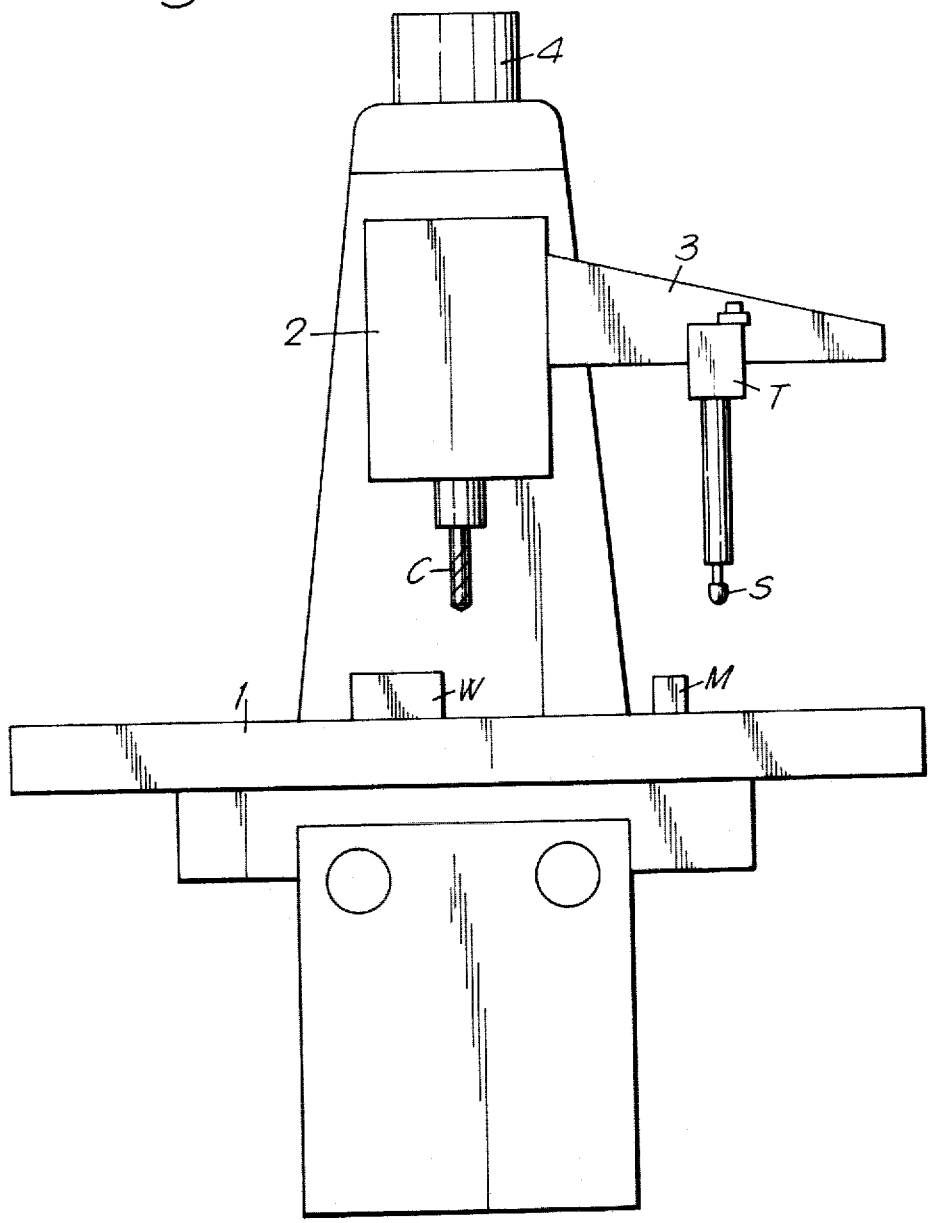
FIG. 1 is a schematic view of the profile milling machine.

Referring now to the drawings, and in particular to FIG. 1, is shown a side view of the entire profiling milling machine. The device consists of table 1, spindle head 2, tracer arm 3, Z-axis motor 4, tracer T, stylus S and cutter C.

Figure 2:
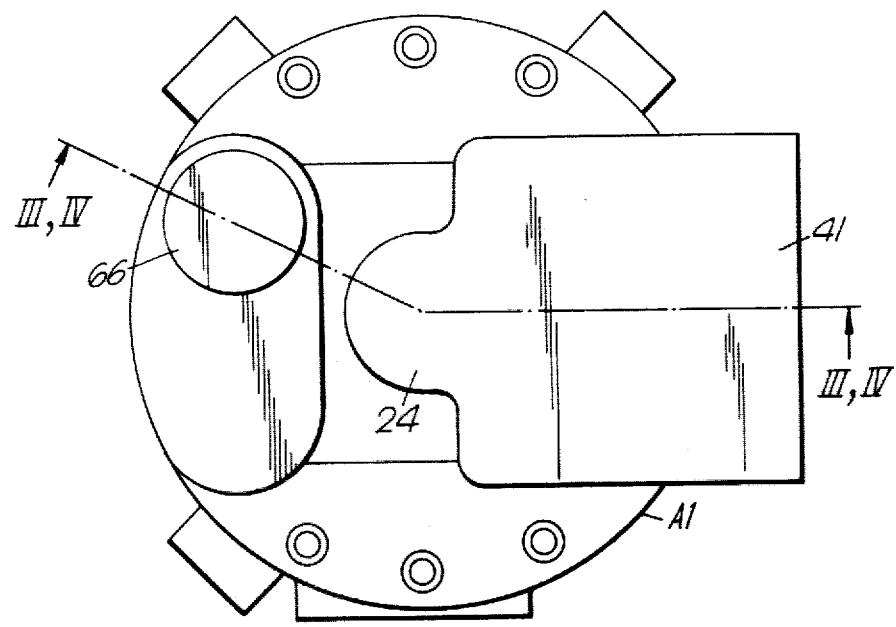
FIG. 2 is a top view of the preferred embodiment of the tracer.
Figure 7:
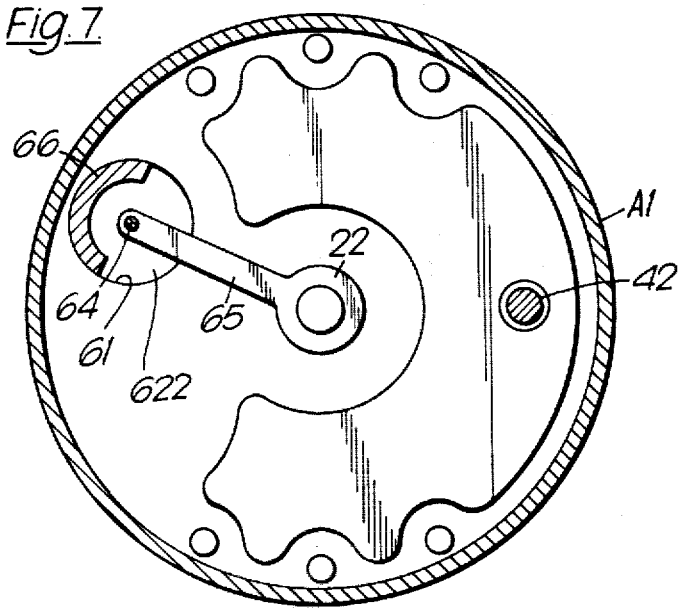
FIG. 7 is a cross-sectional view of the tracer device taken along the lines VII—VII of FIG. 3.
Figure 3:
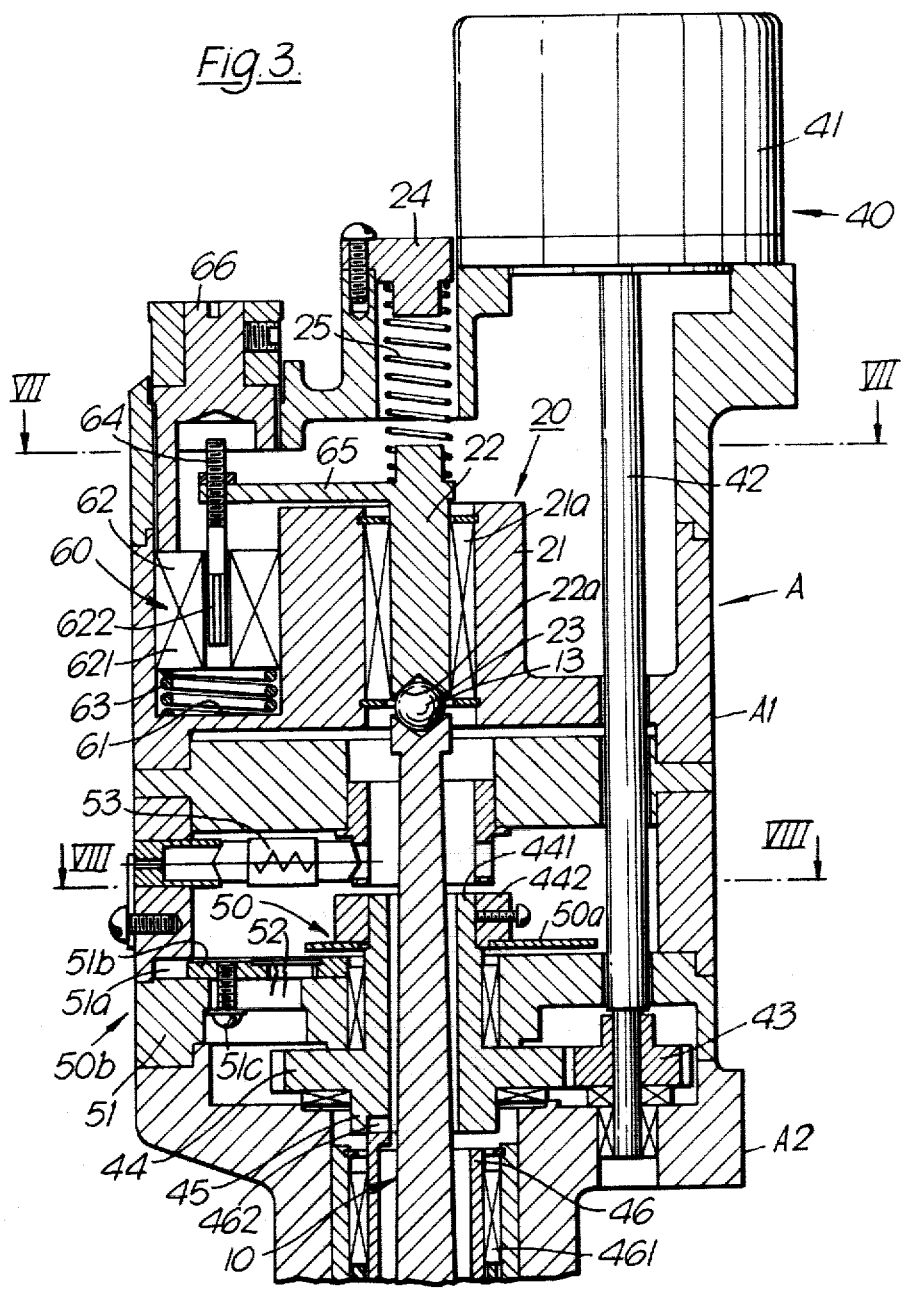
FIG. 3 is a cross-sectional view of the upper portion of said tracer, taken along the line III—III of FIG. 2.
Figure 4:
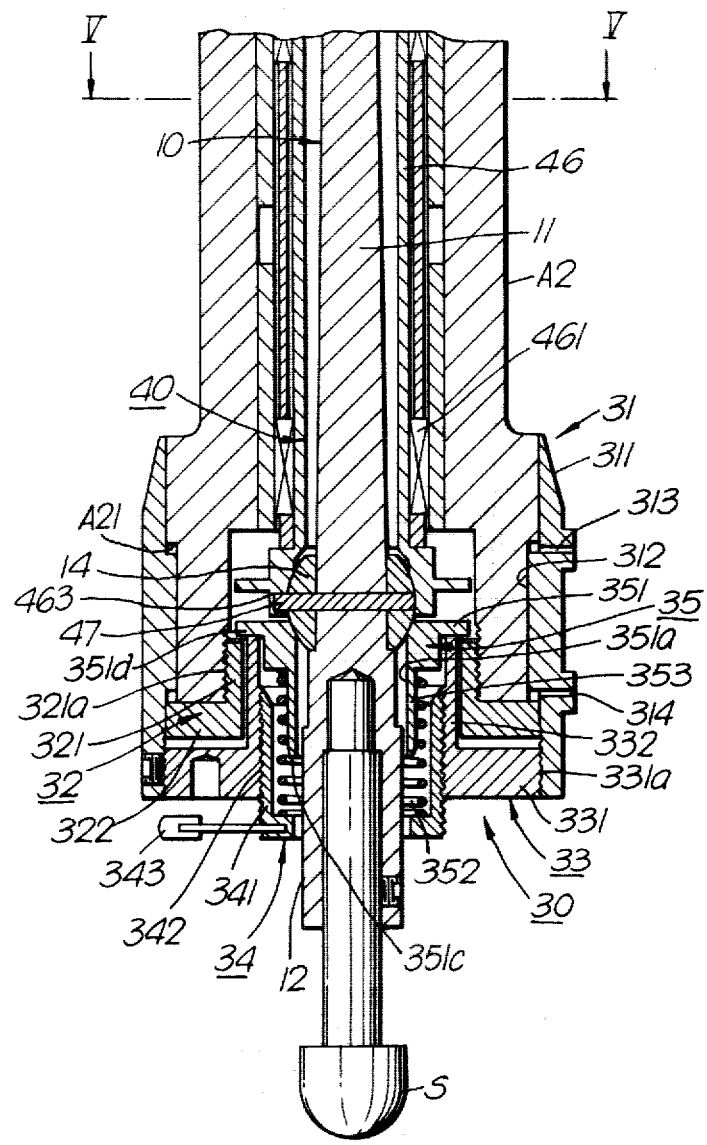
FIG. 4 is a cross-sectional view of the lower portion of the tracer device taken along the line IV—IV of FIG. 2.
Figure 5:
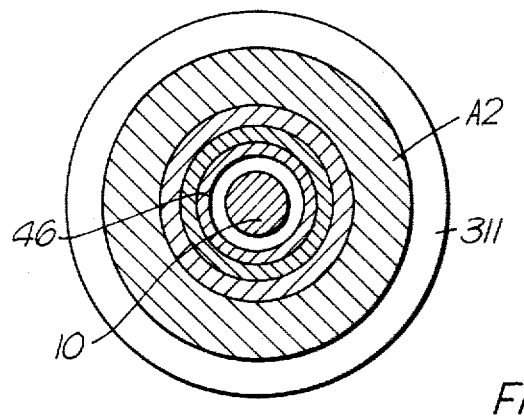
FIG. 5 is a cross-sectional view of the tracer device taken along line V—V of FIG. 4.
Figure 6:
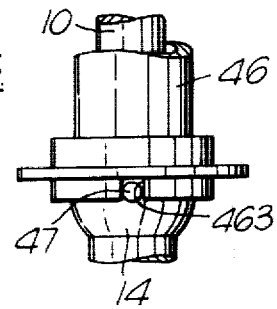
FIG. 6 is a partially cutaway side view of the spherical support member.

Referring to FIGS. 2–4, the tracer spindle 10 is shown consisting of a main body 11, stylus mounting part 12, upper support dent 13 which detects the inclination of spindle 10.

The upper end of support dent is designed in reverse conical form. The lower support spherical fulcrum 14 permits slight inclination of the spindle 10. This movement is accommodated between upper box $A_1$ and lower box $A_2$ of tracer case A.

The column in Tracer T which is on top of the hemispherical stylus S is in connection with a correction allowance system. This system is capable of making various correction allowances due to a stylus S which may be thicker than the cutter C. As is shown in FIG. 12, this system is fitted to spindle 10, having center $O_1$ which is offset by e against the center of rotation of spindle $O_2$.

Displacement bar 22 is provided at spindle upper support 20. Support 20 is held by means of bearing 21a, which penetrates vertically through the central portion of support block 21 in a manner which permits rotation and free vertical movement of the spindle 10. The lower end of the displacement bar 22 has a reverse conical form which shapes support dent 22a. A spherical midway displacement member 23 is held between support dent 22a and upper support dent 13. Spring retainer 24 is fitted into upper box 1a in a detachable manner, said spring may be designed so as to be screw adjustable. Press-down spring 25 is inserted between displacement bar 22 and retainer 24.

Spindle lower support 30 retains a tracer spindle 10 almost vertically in a manner which permits rotation, slight inclination and slight vertical movememt. Support tube 31 is roughly concentric about spindle 10 on the outer periphery of case 2a in a manner which permits the slight vertical oscillation of the tube 31. Support tube 31 consists of cylindrical body 311 and peripheral bank 312. On the upper and lower sides and the top and bottom face of the bank 312, there is provided pressurized oil outlets 313 and 314 for lowering and raising the spindle. At the lower periphery of case $A_2$, circular edge A21 is formed on the top of peripheral bank 312, which serves as an upper stopper to resist the upper limit of movement of the support tube 31.

In order to restrict the lower limit of movement of support tube 31, support tube lower stopper 32 is positioned in a roughly concentric relationship with spindle 10 and is fixed in the lower interior of lower cylindrical part $A_2$ by means of outer screw 321a of mounting cylinder 321. Outer circular flange 322 provided at the lower end of mounting cylinder 321 closely contacts the lower end of lower cylindrical part $A_2$. The circumferential edge of flange 322 serves as a stopper for the peripheral bank 312.

Lift-up member 33 is located at the lower end of support tube 31. Lift-up member 33 is roughly concentric about spingle 10 so as to lift the spindle 10 temporarily and slightly upward. Member 33 consists of mounting flange 331 fitted in the inside of support tube 31 by means of outer screw 331a. Cylindrical body 332 is positioned in the center of member 33 and is designed to lift spindle 10 by its upper end.

In order to support spindle 10 by means of contact pressure adjusting spring 352 (which is explained hereinafter) spring shoe 34 are provided in a position roughly concentric about spindle 10. The spring shoe 34 consists of cylindrical spring shoe body 341 having a hole therein and a bottom which is fitted to the inside of said cylindrical body 332 by means of outer screw 342. Contact pressure adjusting handle 343 is provided at the lower end of spring shoe 34.

In order to hold the spherical member of spindle 10, there is provided a spindle guide 35 which is positioned in a roughly concentric position about the member 14 and spindle 10. Spindle guide 35 includes a spindle receiver 351, and spring 352 which allows the adjustment of the contact pressure of stylus S with respect to model M and spring guide tube 353.

As is shown in FIG. 3, spindle drive unit 40 rotates tracer spindle 10. Drive unit 40 contains motor 41, first drive shaft 42, pinion 43, gear 44, and toothed drive piece 45, which is provided at the bottom of the gear 44. A second drive shaft 46, which is hollow, is loosely fitted to the outer periphery of tracer spindle body 11, and is supported by bearing 461 along its sides with spindle spherical part 14 supporting the bottom of shaft 46. Thus, the shaft 46 is supported in a manner which permits rotation and slight vertical oscillation. The upper end of shaft 46 is provided with driven piece 462. The shaft 46 is in mesh with the drive piece 45. Engagement notch 463 is provided at the lower end of shaft 46 so as to engage rotation arm 47 and transmit the rotation of the shaft 46 to spindle 10.

Figure 8:
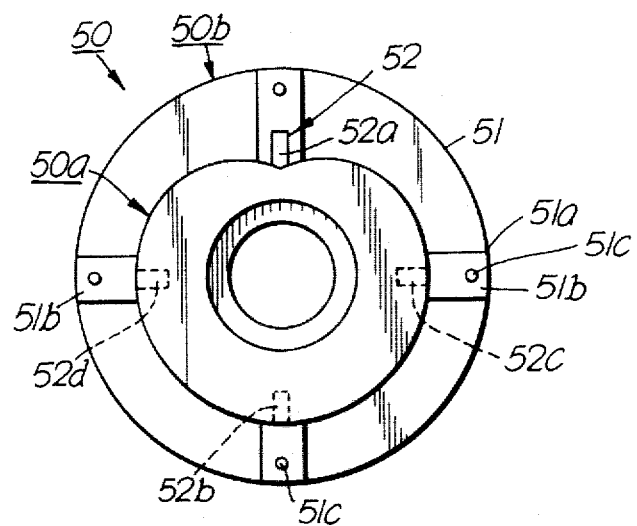
FIG. 8 is a cross-sectional view of the tracer device taken along the line VIII—VIII of FIG. 3.

Table shift command part 50 is housed in case $A_1$. As shown in FIGS. 3, 8 and 9, part 50 consists of table shift speed ratio command plate 50a and table shift speed ratio detector 50b. Detector 50b includes insulation disc 51, photoelectric element 52 and light source 53. Insulation disc 51 for mounting photoelectric elements 52 is concentrically and loosely fitted to box 441 of gear 44 and is fixed in case $A_1$ by means of four equally spaced radial grooves 51a provided on the peripheral surface of case $A_1$. Within the grooves 51a, there is fitted mounting pieces 51b by means of clamps 51c in a manner which allows free radial movement of the disc 51. Photoelectric transducer element 52, as is shown in FIGS. 8 and 9, consists of four rectangular plates 52a, 52b, 52c l and 52d. These plates are fitted to mounting pieces 51b at equal intervals on the periphery of a concentric circle. The concentric circle has a shaft center $O_2$ which is indicated by the center 11 of spindle 10. The plates 52a and 52b are opposed to the longitudinal moving direction of the table (i.e. the Y-axis) while 52c and 52d are made to confront the lateral moving direction of the table (i.e. the X-axis). The voltage created by these four elements is amplified to rotate the direct current motors (not shown) which drive the X-axis and Y-axis of the operation unit. Alternatively, the created voltage may supply power to a servovalve in order to drive a hydraulic motor or hydraulic cylinder which is designed to move the worktable in two directions intersecting with each other at right angles both longitudinally and laterally. Light source 53 confronts photoelectric element 52. Namely, plates 52a and 52b are connected electrically to the Y-axis motor and generator voltage for moving the work table in -Y and Y direction, respectively, when they receive light from light source 53. Similarly, plates 52c and 52d are connected to the X-axis motor and generate voltage in -X and X direction, respectively.

Table shift command photomask plate 50a is installed between photoelectric element and light source 52. Mask 50a is concentric with spindle 10 by means of gear box 441 and collar 442. As illustrated in FIG. 10, the distance L from center rotation $O_2$ of plate 50a to the outer periphery is set so that it will be symmetrical to striaght line N which runs through point R and center of rotation $O_2$. From point R at 0° up to positive and negative 90° there is a gradual increase of L according to the curvature of H(1-cosB). In this formula, H is the maximum increment of distance from center of rotation of command plate 50a to the outer periphery and B is the angle of the radius vector with respect to symmetrical line N of command plate 50a. L is constant at any angle other than the range mentioned above. When the point R corresponds to either one of the photoelectric elements 52, for instance, 52C, the photoreceiving area of 52C is maximum. When it corresponds to an angle range of constant distance, the photoreceiving area is O. The straight line N is made to coincide with a straight line M which connects stylus center $O_1$ and spindle center $O_2$. Also, point R is positioned at the $O_1$ side rather than the $O_2$ side (see FIGS. 13A, 13B, 13C and 13D).

Spindle inclination detecting unit 60 issues a signal to change the rotational speed of motor 41 in proportion to the extent of the vertical inclination of spindle 10 when stylus S contacts the model as shown in FIG. 3. Differential transformer 62 consists of cores 622 which move in a direction parallel to that of displacement bar 22. The movement is created by coil 621 and support spring 63 which is housed in a cylindrical cavity 61 in block 12. Spring 63 is useful for biasing the coil upward. Core holding bar 64 is held in a vertical position and is mounted in a manner which permits free height adjustment by means of outer screw and arm 65.

This core holding arm 65 projects outward perpendicularly from the upper portion of displacement bar 22. Height adjusting member 66 is connected to the upper end of trace case upper box A1, which is found right above the differential transformer. Height adjusting member 66 for coil 621 is fitted to A1 in a detachable manner by screws.

The signal from differential transformer 62 is specified as follows:

While stylus S is not in contact with model M on the table, stylus S is at the lowest position with respect to case A by virtue of its own gravitational weight. In this position the differential transformer creates a negative voltage. When stylus S contacts model M, the voltage may become zero. However, depending upon the extent of inclination a positive voltage may be created.

The following is a description of the operation modes of the preferred embodiment of the device. When performing contour profiling (X-Y axis profiling), spindle 10 remains at the lowest position with respect to case A. The spindle is lifted by the lift-up means 33. Next the core 622 of the differential transformer is lowered below the zero volt position, i.e., at the position where the voltage of differential transformer indicates a slight negative value. When this occurs motor 41 rotates at a low speed and the rotation is transmitted to a tracer spindle 10 and stylus S via reducing gears 43 and 44, and second drive shaft 46.

As shown in FIG. 13a, when model M and stylus S are apart from each other, spindle 10 is given rotation in the direction of arror D1 by motor 41, by the minus voltage from differential transformer 62. When model M is brought into contact with stylus S by manually moving the table, the offset of stylus S and rotation of motor 41 causes stylus S to be pressed against the model M. In reverse proportion to the rise of ball 23 caused by the inclination of the spindle 10, the motor 41 decreases its speed and stops. In the stage shown in FIG. 13b, there is generated a table signal in the direction of arrow F through elements 52a and 52c. These elements 52a and 52c generate signals of -Y and -X, respectively, when partially exposed to the light source 53 with the mask plate 50a masking the light partially. When the model M causes a further increase in the spindle inclination, the voltage transformer 62 generates a positive signal and the motor 41 rotates in the D2 direction and stops when the spindle inclination returns to the preset value where the transformer 62 is no longer generating any voltage. When model M makes another advancement, the voltage of the transformer becomes positive again and causes the motor 41 to rotate in the D2 direction in order to reach the stage shown in FIG. 13d. Consequently, as shown in FIG. 13c, lines m and n are parallel to the tangential direction at the contact point of model M. In another word, photoelectric transducer element 52 sends a signal to the table servo mechanism to move lines m and n in a specified direction along model M being remote by the distance of the radius of stylus S minus the displacement and at the right angle to the normal line of model M.

Attention must be drawn to the fact that the profiling speed is constant. Suppose, in FIG. 11, the rotation angle of line n of plate 50a with respect to the diameter of photoelectric elements 52a and 52b is B and that the photo receiving lengths of photoelectric elements 52a and 52d are $h_1$ $h_2$, respectively. Since the maximum photo receiving height of the photoelectric element is equal to H, it follows that:

$h_1 = H - H(1-cosB) = HcosB$ $h_2 = H - H[1-cos(90-B)] = HsinB$

Since the profiling speeds in each axial direction are respectively proportional to $h_1$ and $h_2$, the total speed in the two axial directions is proportional to $\sqrt{h_1^2+h_2^2}$. Hence, it follows that:

$$\sqrt{h_1^2 + h_2^2} = H\sqrt{\cos^2 B + \sin^2 B} = H.$$

These formulas indicate that the profiling speed is always constant.

In FIG. 9, the signal generation directions of the photoelectric elements (i.e., right, left, upper, lower) are so arranged as to feed the tables in the directions of positive X, negative X, positive Y, and negative Y, respectively. Point R of plate 50a should be positioned opposite stylus center $O_1$ with respect to spindle center $O_2$.

On the other hand, when using the device in the surface profiling mode (X-Z axis or Y-Z axis), an electric signal from differential transformer 62 is applied to the spindle head feeding motor (Z-axis motor) 4. In this case, the offsetting of stylus S against spindle 10 is not necessary.

Figure 14:
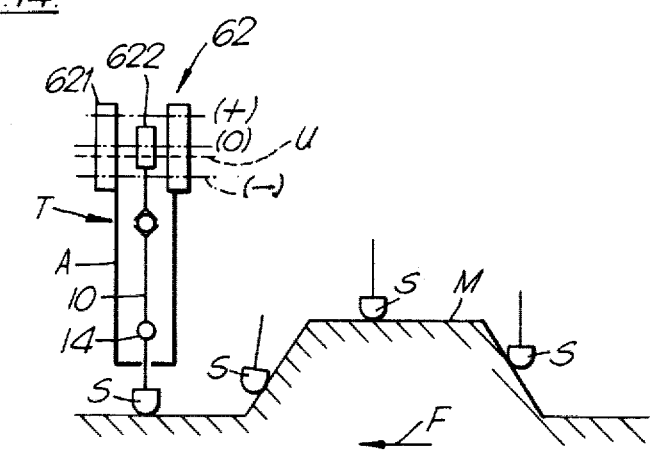
FIG. 14 is a schematic view of the tracer device acting on a model during a surface profiling operation.

This mode is explained with reference to FIG. 14. While stylus S is not in contact with Model M, stylus S is at its lowest position with respect to case A by virtue of its own gravitation weight. In this position differential transformer 62 generates a negative signal so that motor 4 lowers the spindle head 2 in order to match the lower position of stylus S and tracer T. When stylus S contacts model M, stylus S ascends with respect to case A, and differential transformer 62 reaches a zero potential state. Accordingly, the motor 4 stops and model M is fed in the direction F in order to profile the horizontal surface. When stylus S reaches the right ascent slope, stylus S inclines slightly to the relative profiling direction with respect to model M. At this time, core 622 ascends, and differential transformer 62 gives off a positive signal in proportion to the amount of ascent, thus causing the motor 4 to raise tracer T at a speed proportional to the amount of ascent of the rise of stylus S. When profiling right descent slope model M moves in the direction of arrow F and the stylus inclines slightly and stays at a low position with respect to case A. Hence, differential transformer 62 generates a negative signal and motor 4 lowers the tracer T.

The same steps are taken if stylus S hits against a vertical surface or a steep slope. However, when the inclination extent of stylus S becomes very large the profiling accuracy becomes unsatisfactory. This problem can be solved by lifting stylus S as in relation to case A corresponding to the amount of inclination. This lifting can be accomplished by a supplemental device not shown. Such a device would be activated if the inclination stylus S increased so as to cause a positive or negative signal of differential transformer, said signal exceeding a preset value. When this occurred, a signal would be sent out to the supplemental device thus causing the stylus to be raised. For example, the device might be an oil supply solenoid valve causing to open and thus feed pressurized oil into oil port 314 in tracer support tube 31, thereby lifting tube 31 with respect to case A. In this embodiment the lifting extent would be limited to the negative signal generating position which is slightly lower than the zero position, as indicated by broken line U in FIG. 14. Thus, stylus S is always contacting model M and its inclination increment is blocked thus maintaining a constant slight inclination.

In the case of surface profiling, as explained above, since stylus S inclines when reaching the ascent slope of model M, cutter C is relatively ahead of the stylus so that the cutting of cutter C goes deeper into work piece than it is desired. However, when reaching the descent slope, the cutting of cutter C becomes more shallow than it is desired.

Figure 16:
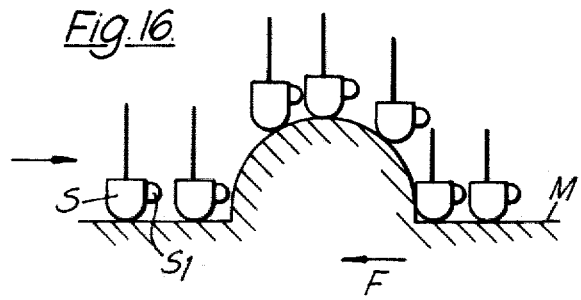
FIG. 16 is a schematic view of another embodiment of the stylus in operation on a model.

This problem can be solved by giving a correction allowance to compensate for stylus inclination. When stylus S profiles the model ascent slope the correction allowance compensates for the error. When the stylus profiles the descent slope the error is corrected for by inverting stylus S 180°. In order to make such a correction allowance stylus S may be offset on the profiling direction side with respect to spindle 10, or it may be inclined or, as shown in FIG. 16, it may be fitted with a leading button $S_1$ on one side. Photoelectric element 52 and command plate 50a, mentioned above, are examples of directional holding means for stylus S.

Figure 15:
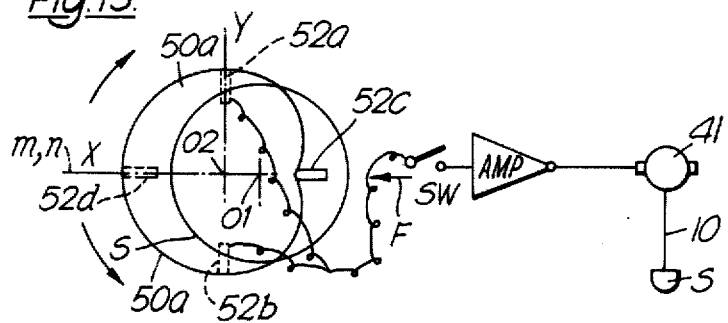
FIG. 15 is a schematic wire diagram showning an embodiment of the directional holding means and spindle inverting means.

Referring now to FIG. 15. When profiling in the direction of X-axis, wiring is set up such that the electric signals from elements 52a and 52b on Y-axis are sent to motor 41 by way of switch SW and amplifier AMP. Accordingly, the rotating direction of motor 41 is determined. The rotation may be clockwise, or counterclockwise, for instance, with respect to signals from elements 52a and 52b, respectively.

Accordingly, if elements 52a and 52b receive even a slight quantity of light, command plate 50a rotates in order to cut off all the light. When element 52b receives a full quantity of light stylus center $O_1$ advances ahead of spindle center $O_2$ in the profiling direction, so that the table moves in the minus X direction as indicated by arrow F, while lines m and n are running along the X-axis.

When the table reaches the left limit position, a reverse rotation command signal is issued to motor 41 from an already known position detecting means which consists of limit switch, dog, etc. (not shown). This signal is sent, for instance, to an already known reverse rotation means designed to change the motor polarity or otherwise invert the rotation direction. Consequently, the motor starts to run in the opposite direction and element 52d receives a full quantity of light and the table is sent in the positive X-axis direction. After Y direction pick feed is given, the table reaches its right limit position, and motor 41 reverses its direction, and stylus S and command plate 50a return to their original status.

As mentioned above certain problems are created when profiling an ascent slope. When the slope raises quickly there is a sudden increase in the amount of cutting necessary. This causes the table feed speed to be small in order to prevent the cutter from jamming. This problem can be solved by designing the device which prohibits cutting when profiling an ascent slope and only permits cutting while profiling a descent slope, thereby causing smaller cutting error.

Referring now to FIG. 16. If the correction allowance of stylus leading button $S_1$ is enlarged to such an extent that cutter C does not touch the work even when stylus S contacts model M, cutter C does not cut when profiling an ascent slope, and only cuts when profiling a descent slope. By profiling the cutting with the stylus inverted (by said stylus inverting means) the entire model can be profiled, and the workpiece cut perfectly.

Since the servo capacity of this device can respond in a highly accurate manner, it can sufficiently cope with vibrations induced by even the very heavy cutting of a 3000 rpm cemented carbide cutting tool. The device is designed such that when abrupt changes in the profile direction occur the servo mechanism has sufficient time to complete the speed reduction and direction change of the table. Therefore, no abnormal biting is caused even in high speed profiling with heavy cutting, for instance, at 1500 mm/min or 2000 mm/min.

The work table is not directly driven by the stylus displacement via the first detecting means of the spindle inclination detecting unit. But rather, it is driven by the second detecting means of the work table shift common plate and the shift detecting means in addition to said first means. Thus, the direct effects of the machine vibration due to cutting are eliminated, which makes it possible to do highly accurate profiling work.

The spindle lifting means aids in making better processing precision by making small corrections with regard to the stylus. This effect is noticable even when cutting a steep ascent slope. By inverting the stylus, the cutting of both ascent and descent slopes in even the roughest of the cut surfaces is greatly reduced as compared with that of conventional processes. The result is a tremendous savings of the man-hours required in finishing work.

It should be noted that in place of the photoelectric element for detecting the amount of table shift, and then delivering electric signals in analog fashion, there may be substituted a wire strain gauge or piezo-electric element which changes electric resistance by strain or a differential transformer, hydraulic pilot lamp, or other means. In such embodiments a leaf spring (connected to the wire strain gauge, piezo-electric element), the iron core of the differential transformer, or the end of the spool of the pilot valve are positioned so as to contact and function on the circumferential surface of command plate 50a. The signal eminating from plate 50a, moves the table and the tracer.

The above mentioned embodiments may also be used in place of the differential transformer of the spindle inclination detecting part. For example, the end of the leaf spring which is oriented primarily downward in order to issue a negative signal is horizontally pressed on the upper end of the displacement ball 23 and fitted at the case side. The wire strain gauge is attached to said spring. In another example, the piezo-electric element is positioned on the upper end of the displacement ball 23 by means of a spring. In a further example, a light mask plate is fitted on the spindle, and a light source and photoelectric elements are arranged oppositely across from the light source. These elements are placed above and beneath the light mask plate which is located at a neutral position.

A magnetic selenoid and induction magnet may be utilized as the spindle lifting means, instead of the hydraulic system, electric means, or pneumatic means. It should be noted that another embodiment of the stylus inverting means includes utilizing oil pressure in order to rotate the spindle 180°.

The instant invention has been shown in this criterion and what is considered to be the most practical and preferred embodiments. It is recognized, however, that the departures may be made therefrom within the scope of the invention and that obvious modifications would occur to person-skilled in the art.

What is claimed:

1. A profiling device for contour profiling, comprising:
   (A) a horizontal planar surface work table; and
   (B) a frame member extending vertically from, and connected to, said table;
   (C) a spindle head frame casing movably connected to said frame member at a position above said table, said casing having contained therein a vertically positioned spindle;
   (D) a tracer arm member connected to said spindle head frame casing so as to extend from said casing, said arm extending over a portion of said table;
   (E) a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;
   (F) a spindle inclination detecting unit in connection with said spindle, said detecting unit providing a means to detect spindle inclination in an analog fashion by means of a differential transformer wherein the degree of inclination is detected from the change in rotational speed of said spindle and wherein the degree of spindle inclination is connected to a vertical movement of a displacement bar in connection with said differential transformer;
   (G) a work table shift command plate supported concentrically with said spindle so as to permit the rotation of said plate at the same speed as said spindle, said plate having an outer periphery having a smooth curvature symmetrical to the straight line which passes through said plate and intersects at a right angle with the center of rotation of said plate, said line coinciding with a second straight line connecting a center of said stylus with a center of said spindle;
   (H) two pairs of work table shift detecting means located at equal intervals about the circumference of said spindle at a position corresponding to the outer periphery of said command plate, said shift detecting means being interconnected so as to generate signals according to the relative displacement of said detecting means on the periphery of said command plate; and
   (I) a means for moving a portion of said work table in two directions which intersect with each other at right angles, said means for moving being in connection with, and responding to, said signals from said table shift detecting means.

2. A profiling device for surface profiling, comprising:
   (A) a horizontal planar surface work table;
   (B) a frame member extending vertically from, and connected to, said table;
   (C) a spindle head frame casing movably connected to said frame member at a position above said table, said casing having contained therein a vertically positioned spindle;
   (D) a tracer arm member connected to said spindle head frame casing so as to extend from said casing, said arm extending over a portion of said table;
   (E) a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;

(F) a spindle displacement detecting unit in connection with said spindle, said detecting unit providing a means to detect vertical movement of said spindle in an analog fashion by means of a differential transformer and wherein the degree of spindle inclination is converted to a vertical movement of a displacement bar in connection with said differential transformer; and (G) a means for vertically raising said spindle, said means being capable of temporarily lifting said spindle relative to said tracer head frame casing until said detecting unit generates a signal indicating the spindle inclination and vertical movement has exceeded a set value.

3. A profiling device for surface profiling as in claim 1 wherein:

said spindle contained in said tracer head frame casing has a stylus connected at its lower end; and said stylus is provided with a correction allowance means at a point where said stylus contacts a model, and said spindle displacement detecting unit sends out signals in order to control the vertical shift speed of said stylus in proportion to the extent of inclination and vertical movement of said spindle.

4. A profiling device for contour profiling including a tracer which has a tracer spindle and a stylus, which comprises:

a horizontal planar surface work table; and a frame member extending vertically from, and connected to, said table;

a spindle head frame casing movably connected to said frame member at a position above said table, said casing having contained therein a vertically positioned spindle;

a tracer arm member connected to said spindle head frame casing so as to extend from said casing, said arm extending over a portion of said table;

a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;

a spindle displacement detecting unit in connection with said spindle, said detecting unit providing a means to detect vertical movement of said spindle in an analog fashion by means of a differential transformer and wherein the degree of spindle inclination is converted to a vertical movement of a displacement bar in connection with said differential transformer; and the stylus eccentrically fixed at a lower end of a tracer spindle, a spindle inclination detecting unit provided so as to detect spindle inclination with respect to contact of the stylus with a model in an analog fashion by a differential transformer and change the rotational speed of the spindle in proportion to the extent of such inclination, a work table shift command plate supported concentrically with said spindle so as to permit the rotation of said plate at the same speed as said spindle, said plate having an outer periphery having a smooth curvature symmetrical to the straight line which passes through said plate and intersects at a right angle with the center of rotation of said plate, said line coinciding with a second straight line connecting a center of said stylus with a center of said spindle;

two pairs of work table shift detecting means located at equal intervals on the circumference which is concentric with the shaft center of the spindle corresponding to the outer periphery of the said command plate, in which these shift detecting means are so connected as to generate signals according to the relative displacement from shift detecting means on the outer periphery caused by rotation of the command plate so that the work table can be moved in two directions which intersect with each other at right angle.

5. A profiling device for surface profiling including a tracer which has a tracer spindle and a stylus, and a tracer case wherein, said spindle has a stylus fitted at its lower end said spindle is supported in said tracer case in a manner to permit a slight inclination and vertical movement; said device further comprising a spindle displacement detecting unit; and a spindle lifting means connected to said spindle in such a manner that it may be lifted temporarily relative to said tracer case after receiving a signal from the spindle displacement detecting unit showing the spindle inclination and vertical movement has exceeded a set value.

6. A profiling device for surface profiling including a tracer which has a tracer spindle and a stylus, which comprises:

the stylus being given a correction allowance at the contact point between a model and the said allowance being taken a stylus inclination extent into consideration, a horizontal planar surface work table; and a frame member extending vertically from, and connected to, said table;

a spindle head frame casing movably connected to said frame member at a position above said table, said casing having contained therein a vertically positioned spindle;

a tracer arm member connected to said spindle head frame casing so as to extend from said casing, said arm extending over a portion of said table;

a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;

a spindle inclination detecting unit in connection with said spindle, said detecting unit providing a means to detect spindle inclination in an analog fashion by means of a differential transformer wherein the degree of inclination is detected from the change in rotational speed of said spindle and wherein the degree of spindle inclination is connected to a vertical movement of a displacement bar in connection with said differential transformer;

a spindle displacement detecting unit is provided so as to detect in an analog fashion the inclination and vertical movement of the spindle due to contact of the stylus with a model and also to change the vertical shift speed of the tracer in proportion to the extent of inclination and vertical movement, the stylus being enlarged by a correction allowance at the contact point with a model and wherein said correction allowance is provided for with consideration to the extent of inclination of said stylus;

a stylus directivity supporting means being provided so that the stylus correction allowance may direct toward the profiling direction with respect to the spindle during profiling operation, and an inverting means being furnished to invert the spindle by 180 degrees by receiving a singal which is issued when a work table comes to a movement limit position.

7. A profiling device for contour and a surface profiling including a tracer which has a tracer spindle and a stylus, which comprises:

a horizontal planar surface work table; and a frame member extending vertically from, and connected to, said table;

a spindle head frame casing movably connected to said member at a position above said table, said casing having contained therein a vertically positioned spindle;

a tracer arm member connected to said spindle head frame casing so as to extend from said casing, said arm extending over a portion of said table;

a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;

a spindle inclination detecting unit in connection with said spindle, said detecting unit providing a means to detect spindle inclination in an analog fashion by means of a differential transformer wherein the degree of inclination is detected from the change in rotational speed of said spindle and wherein the degree of spindle inclination is connected to a vertical movement of a displacement bar in connection with said differential transformer;

the stylus eccentrically fixed at a lower end of a tracer spindle, a spindle displacement detecting unit provided so as to detect spindle inclination and vertical movement with respect to contact of the stylus with a model in an analog fashion by a differential transformer and change the rotational speed of the spindle in proportion to the extent of such inclination and vertical movement, a work table shift command plate supported concentrically with said spindle so as to permit the rotation of said plate at the same speed as said spindle, said plate having an outer periphery having a smooth curvature symmetrical to the straight line which passes through said plate and intersects at a right angle with the center of rotation of said plate, said line coinciding with a second straight line connecting a center of said stylus with a center of said spindle;

two pairs of work table shift detecting means located at equal intervals on the circumference which is concentric with the shaft center of the spindle corresponding to the outer periphery of the said command plate, in which these shift detecting means are so connected as to generate signals according to the relative displacement from shift detecting means on the outer periphery caused by rotation of the command plate so that the work table can be moved in two directions which intersect with each other at right angle, a spindle lifting means is furnished so that the spindle can be lifted temporarily and relatively with respect to the said tracer case until the detecting part outputs a negative signal slightly lower than zero after receiving a signal from the detecting part showing the spindle inclination and vertical movement has exceeded the set value.

8. A profiling device for surface profiling including a tracer which has a tracer spindle and a stylus, which comprises:

a horizontal planar surface work table; and a frame member extending vertically from, and connected to, said table;

a spindle head frame casing movably connected to said frame member at a position above said table, said casing having contained therein a vertically positioned spindle;

a tracer arm member connected to said spindle head frame casing so as to extend from said casing, said arm extending over a portion of said table;

a tracer head frame casing connected to said arm at a position above said table, said casing having contained therein a vertically positioned tracer spindle, supported within said casing by an upper support member and a lower support member in such a manner so as to permit slight inclination from its vertical position and so as to further permit free rotation;

a spindle inclination detecting unit in connection with said spindle, said detecting unit providing a means to detect spindle inclination in an analog fashion by means of a differential transformer wherein the degree of inclination is detected from the change in rotational speed of said spindle and wherein the degree of spindle inclination is connected to a vertical movement of a displacement bar in connection with said differential transformer;

a spindle displacement detecting unit is provided so as to detect in an analog fashion the inclination and vertical movement of the spindle due to contact of the stylus with a model and also to change the vertical shift speed of the tracer in proportion to the extent of inclination and vertical movement, and a spindle lifting means is furnished so that the spindle can be lifted temporarily and relatively with respect to the said tracer case until the detecting part outputs a negative signal slightly lower than zero after receiving a signal from the detecting part showing the spindle inclination and vertical movement has exceeded the set value, the stylus being enlarged by a correction allowance at the contact point with a model and wherein said correction allowance is provided for with consideration to the extent of inclination of said stylus, a stylus directivity supporting means being provided so that the stylus correction part may direct toward the profiling direction with respect to the spindle during profiling operation, and an inverting means being furnished to invert the spindle by 180 degrees by receiving a signal which is issued when a work table comes to a movement limit position.

9. A profiling device as claimed in claim 4, wherein the tracer spindle having at its upper end an upper support dent designed in reversed conical form and being supported by an upper support and a lower support, said upper support comprising:

a displacement bar which penetrates vertically through a support block in a manner to permit free vertical movement and has at its lower end a lower support dent in reversed conical form opposite to the upper support dent of the tracer spindle, a spherical midway displacement member being held between the said two support dents, a spring means biasing said displacement bar downwardly, and the inclination of the tracer spindle being converted to vertical displacement of the displacement bar, which being connected to the spindle inclination detecting unit.

10. A profiling device as claimed in claim 9, wherein the spindle inclination detecting unit comprising, a differential transformer coil being housed in cylindrical cavity in a support block, and a differential transformer core being connected to the displacement bar, and at least one of these coil and core being free for vertical movement.

11. A profiling device as claimed in claim 10, wherein the differential transformer coil being housed in the cylindrical cavity in the support block freely for vertical movement, a support spring being housed between the coil and the bottom of the cylindrical cavity for biassing the coil upwardly, a height adjustment member for said support spring being provided in contact with the upper surface of the coil, the core being provided on a core holding arm projecting from the displacement bar in a manner to permit free height adjustment.

12. A profiling device as claimed in claim 4, 9, 10, or 11, wherein the work table shift command plate of which distance from center of rotation to the outer periphery increasing gradually according to the curvature of H (1-cosB) (where, H: maximum increment of distance from center of rotation $O_2$ of command plate $50_a$ to the outer periphery, B: an angle of radius vector with respect to symmetrical line n of command plate $50_a$), and being constant at other angle range than mentioned above, the said straight line n being made to coincide with a straight line m which connects stylus center $O_1$ and spindle center $O_2$.

13. A profiling device as claimed in claim 12, wherein the work table shift detecting means including an insulation disk fixed in the tracer case, four photo-electric transducer elements mounted on the insulation disk and a light source confronting the photoelectric elements via the work table shift command plate, said each two photoelectric transducer elements confronting each other via the center of the tracer spindle being positioned along with longitudinal and lateral direction of the work table motion respectively.

14. A profiling device as claimed in claim 5, wherein the tracer spindle being supported by an upper support and a lower support, said lower support including a spindle guide which supports the spindle in a manner to permit a slight inclination, vertical movement and free rotation in the tracer case, said spindle guide being lifted.

15. A profiling device as claimed in claim 14, wherein the spindle guide being lifted by fluid pressure.

16. A profiling device as claimed in claim 15, wherein a support tube being provided on the lower part of the tracer case in a manner to permit slight vertical oscillation, an upper and a lower stopper for said support tube motion being provided, a lift-up member being provided on the support tube, the tracer spindle being lifted by said lift-up member.

17. A profiling device as claimed in claim 16, wherein the support tube being fixed on the lower outer periphery of the tracer case, said support tube having a peripheral bank on its interior surface by way of step in the midway in the axial direction, a pressure fluid cavity being provided between said step and the stoppers, a pressure fluid hole connecting to said pressure fluid cavity being furnished in the support tube.

18. A profiling device as claimed in claim 6, wherein the tracer spindle having at its upper end an upper support dent designed in reversed conical form and being supported by an upper support and a lower support, said upper support comprising:

a displacement bar which penetrates vertically through a support block in a manner to permit free vertical movement and has at its lower end a lower support dent in reversed conical form opposite to the upper support dent of the tracer spindle, a spherical midway displacement member being held between the said two support dents, a spring means biasing said displacement bar downwardly, and the inclination of the tracer spindle being converted to vertical displacement of the displacement bar, which being connected to the spindle inclination detecting unit.

19. A profiling device as claimed 18, wherein the spindle inclination detecting unit comprising, a differential transformer coil being housed in cylindrical cavity in a support block, and a differential transformer core being connected to the displacement bar, and at least one of these coil and core being free for vertical movement.

20. A profiling device as claimed in claim 19, wherein the differential transformer coil being housed in the cylindrical cavity in the support block freely for vertical movement, a support spring being housed between the coil and the bottom of the cylindrical cavity for biassing the coil upwardly, a height adjustment member for said support spring being provided in contact with the upper surface of the coil, the core being provided on a core holding arm projecting from the displacement bar in a manner to permit free height adjustment.

21. A profiling device as claimed in claim 6, wherein the correction allowance added to the stylus being such an extent to compensate for stylus inclination.

22. A profiling device for surface profiling including a tracer which has a tracer spindle, a stylus, and a tracer case, said stylus being enlarged at a contact point with a model the extent of said enlargement being such that a cutter does not touch a work piece even when the stylus contacts the model, the spindle having the stylus fitted at its lower end is supported in the tracer case in a manner to permit a slight inclination, vertical movement and free rotation, a spindle displacement detecting unit is provided so as to detect in an analog fashion the inclination and vertical movement of the spindle due to contact of the stylus with a model and also to change the vertical shift speed of the tracer in proportion to the extent of inclination and vertical movement, a stylus directivity supporting means being provided so that the stylus correction part may direct toward the profiling direction with respect to the spindle during profiling operation, and an inverting means being furnished to invert the spindle by 180 degrees by receiving a signal which is issued when a work table reaches a movement limit position.

23. A profiling device as claimed in claim 6, 8, 18, 19, 20 or 22, wherein the stylus directivity supporting means including a photo mask plate of which distance from center of rotation to the outer periphery symmetrically increasing gradually according to the curvature of H(1-COS B) (wherein H is a maximum increment of distance from center of rotation 02 of the plate 50A to the outer periphery, B is an angle of radius vector with respect to symmetrical line N of the plate 50A) from near point at zero degree up to positive and negative 90 degrees, and being constant at other angle range than mentioned above, the direction of a straight line connecting the distant point and the near point of the photo mask plate being made to coincide with the direction of straight line connecting a figure center, and a rotation center of the stylus; and an insulation disk fixed in the tracer case, four photoelectric transducer elements mounted radially on the insulation disk at equal intervals on the periphery of a circle concentric with shaft center 02 of the spindle, said each two photoelectric transducer elements confronting each other via a center of the tracer spindle being positioned along with longitudinal and lateral direction of the work table motion respectively, the voltage created by these four elements being designed to move the work table in two directions intersecting with each other at right angles, and further wherein electric signals from photoelectric transducer elements 52A and 52B are sent to motor 41 whose rotation may be clockwise or counterclockwise with respect to signals from elements 52A and 52B are sent to motion 41 whose rotation may be clockwise or counterclockwise with respect to signals from elements 52A and 52B respectively, and a light source confronting the photoelectric element.

* * * * *